Patented July 27, 1954

2,685,041

UNITED STATES PATENT OFFICE 2,685,041

APPARATUS FOR EXAMINING MATERIALS BY ULTRASONIC SHEAR VIBRATION

Geoffrey Bradfield, Surbiton, England, assignor to National Research Development Corporation, London, England, a corporation of Great Britain Application November 13, 1951, Serial No. 255,939

Claims priority, application Great Britain November 17, 1950

2 Claims. (Cl. 310—8.1)

The present invention relates to methods of and apparatus for examining the properties of materials by propagating ultrasonic waves in such materials. These methods are useful for discovering and locating discontinuities in the structure of a mass of material. For example, this method of examination may be used for discovering internal flaws in metallic forgings and castings.

It is known that ultrasonic vibrations can be launched in a medium by coupling an electro-mechanical transducer element, such as a magnetostrictive or piezoelectric device, to the surface of the medium. It has moreover been proposed to provide an array of electro-mechanical transducers arranged in a mosaic and energised in appropriate phases to launch in the medium a beam of ultrasonic radiation having a maximum intensity of propagation in a given direction. This direction will depend upon the spacing of the transducer elements in the array and the frequency at which they are excited. To a certain extent the direction may be varied by varying the frequency of excitation; this is possible with piezoelectric elements because the loading produced by the medium extends the frequency range over which the devices may be efficiently excited. Furthermore, the range of angle of deflection of the beam may be extended by using transducers arranged to excite different modes of vibration, e. g. compressional waves and shear waves.

In some cases it may be advantageous to use an intermediate propagating device between the array of crystals and the launching site into the material being tested.

The present invention relates to such intermediate devices particularly for launching shear waves into a medium to be tested.

The invention will be particularly described with reference to the accompanying drawings of which:

Figure 1:
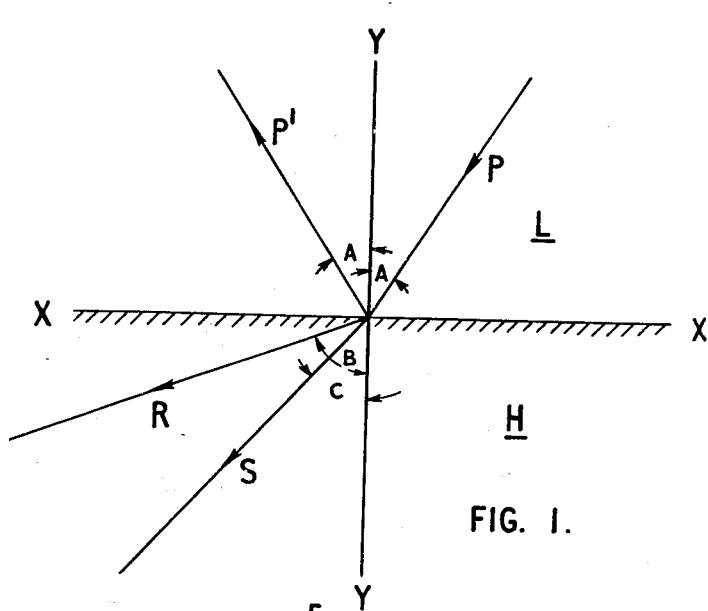
Figure 1 is used to explain the underlying principles of the invention.

In Figure 1 P represents the course of a compressional wave travelling in a medium L and impinging on the boundary XX between the medium L and another medium H. YY is the normal to XX. In general the wave P will generate a compressional wave R and a shear wave S in the medium H and the respective angles A, B and C indicated in the drawing will be given by $P/\sin A = R/\sin B = S/\sin C$, where P, R and S are respectively the speeds of propagation of the corresponding waves, S will be less than P so that C is less than B as indicated in the drawing.

It will be clear that if P is less than R there will be a value of A which makes sin B greater than unity and the wave R will not exist in the medium H but will be represented by a compressional wave P' reflected in the medium L. The value of A when $\sin B = (R \sin A)/P$ becomes unity will be called in this specification and in the appended claims the "compression critical angle." In general if P is less than R, P will also be less than S and there exists another angle of incidence which gives a value of $\sin C = (S \sin A)/P$ greater than unity so that the shear wave S will not exist in the medium H. The value of A when sin C becomes unity will be called in this specification and in the appended claims the "shear critical angle."

It will now be clear that if A, the angle of incidence of the compressional wave P, lies between the compression critical angle and the shear critical angle the shear wave S only will be propagated in the medium H.

The present invention takes advantage of this fact and according to the invention there is provided apparatus for launching ultrasonic waves into a medium and comprising an intermediate propagating device in which ultrasonic waves travel at a lower speed than in the medium and means for launching a compressional wave into the device so that it impinges on a boundary between the device and the medium at an angle of incidence which lies between the compression critical angle and the shear critical angle at the boundary. The compressional waves in the intermediate device will then set up shear waves in the medium and the device may, therefore, be called a mode changer.

Figure 2:
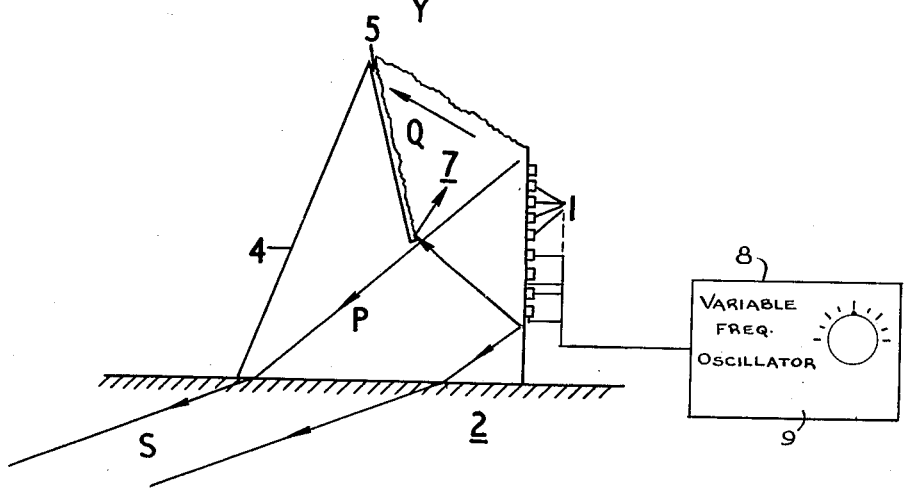
Figure 2 illustrates one embodiment of the invention.

One embodiment of the invention is illustrated in Figure 2 of the accompanying drawings. In this drawing an array 1 of piezoelectric crystals or magnetostrictive oscillators is arranged to be excited to set up a compressional wave P in an intermediate propagating device 4. The wave P will be accompanied by a complementary wave Q which is not wanted and is propagated in the part 7 of the body 4 lying above the saw-cut 5. The part 7 has a rough surface so that the unwanted wave Q is scattered and absorbed therein.

The device 4 is made of a material in which ultrasonic waves travel at a lower speed than in the medium 2 which is to be examined and the geometry of the body 4 and the array 1 is arranged so that the wave P impinges on the boundary between the device 4 and the medium 2 at an angle which lies between the compression critical angle and the shear critical angle. Consequently a shear wave S is propagated in the medium 2. Other waves, not indicated in the drawing, will be generated in the body 4 but these will be absorbed in the body.

Adjacent elements in the array 1 are excited to vibrate in antiphase by the oscillator 3 and the angles at which the waves P and Q will be propagated will depend on the spacing of the elements in the array 1 and the wave length of the waves in the body 4. These angles may easily be calculated by those skilled in this art. The directions of the beams P and S may be varied by varying the frequency of the potential exciting the aray 1 by the frequency control 9.

The speeds of propagation of ultrasonic waves in a medium are given by $$P = \sqrt{E(1-\sigma)/\rho(1+\sigma)(1-2\sigma)}$$

and $$S = \sqrt{E/2\rho(1+\sigma)}$$

where $P$ = speed of compressional waves
$S$ = speed of shear waves
$E$ = Young's modulus of the medium
$\sigma$ = Poisson's ratio of the medium and
$\rho$ = density of the medium In mild steel P and S are respectively about 5950 and 3250 metres per second and in aluminium P and S are respectively about 6250 and 3150 metres per second. When samples of these materials have to be examined the intermediate propagating device may be plastic materials of the methyl methacrylate type such as are sold under the trade names "Perspex" and "Plexiglas." In these materials compressional waves travel with a speed of from about 2500 to 3000 metres per second. Generally speaking in these materials in which ultrasonic waves travel comparatively slowly they are also absorbed comparatively quickly and this factor must be taken into account when choosing a material for the intermediate body. This absorption is not altogether undesirable because, as stated above, unwanted rays are generated in the intermediate body which have to be absorbed. However, the absorption should not be too great, otherwise the wanted ray will not generate a strong shear wave in the medium to be examined.

The array 1 may be an array of separate piezoelectric crystals or a compound array of the kind described in my co-pending patent application Serial No. 255,938, filed November 13, 1951. My co-pending application also explains a convenient method of exciting adjacent elements of the crystal array in anti-phase.

What I claim is:

1. Apparatus for launching ultrasonic shear waves into a medium comprising, a shear wave generator, an intermediate wave propagating member having a face thereof mounted on said medium, said intermediate member consisting of a block of material in which ultrasonic waves travel at a speed lower than that at which said waves travel in said medium, said shear wave generator consisting of an array of piezo-electric crystal elements mounted on said intermediate wave propagating member, means for exciting said array into oscillation so that every other crystal element and alternate adjacent crystal elements in said array oscillate out of phase, and means for varying the frequency of excitation of said crystal elements to launch waves at a frequency determined angle to the mounting face of said block contiguous to said medium, said frequency determined angle resulting in the undesired compressional waves generated by said generator, impinging on the boundary between said intermediate wave propagating member and said medium at an angle of incidence which lies between the compressional critical angle and the shear critical angle for the said boundary, and being reflected away from said medium.

2. Apparatus according to claim 1 and in which the said member is made of polymerized methyl methacrylate.

References Cited in the file of this patent

UNITED STATES PATENTS

| Number | Name | Date |
|---|---|---|
| 2,408,028 | Batchelder | Sept. 24, 1946 |
| 2,525,861 | Carlin | Oct. 17, 1950 |
| 2,527,986 | Carlin | Oct. 31, 1950 |